US008984853B2

(12) United States Patent
Davis et al.

(10) Patent No.: US 8,984,853 B2
(45) Date of Patent: Mar. 24, 2015

(54) ACCESSING A VALVE ASSEMBLY OF A TURBOMACHINE

(75) Inventors: Todd A. Davis, Tolland, CT (US); Joanna Mamrowicz, Lesko (PL)

(73) Assignee: United Technologies Corporation, Hartford, CT (US)

( * ) Notice: Subject to any disclaimer, the term of this patent is extended or adjusted under 35 U.S.C. 154(b) by 1278 days.

(21) Appl. No.: 12/784,731

(22) Filed: May 21, 2010

(65) Prior Publication Data
US 2011/0284103 A1 Nov. 24, 2011

(51) Int. Cl.
*F02G 3/00* (2006.01)
*E03B 1/00* (2006.01)
*F16K 1/30* (2006.01)
*F01D 25/18* (2006.01)
*F01D 25/28* (2006.01)
*F01D 5/14* (2006.01)
*F02C 6/12* (2006.01)
*F01D 9/06* (2006.01)
*F01D 25/16* (2006.01)

(52) U.S. Cl.
CPC .............. *F01D 25/285* (2013.01); *F01D 5/141* (2013.01); *F02C 6/12* (2013.01); *F01D 9/065* (2013.01); *F01D 25/164* (2013.01); *F05D 2240/301* (2013.01); *F05D 2220/40* (2013.01)
USPC ........................ 60/39.08; 137/614.2; 184/6.11

(58) Field of Classification Search
CPC ......... F01D 5/141; F01D 25/285; F02C 6/12; F05D 2220/40; F05D 2240/301
USPC ........................ 60/39.08, 39.83, 39.091, 267; 137/614.2; 184/6.11
See application file for complete search history.

(56) References Cited

U.S. PATENT DOCUMENTS

| 1,873,782 | A |   | 8/1932  | Nixon    |          |
|-----------|---|---|---------|----------|----------|
| 1,944,900 | A |   | 1/1934  | Miller   |          |
| 1,953,547 | A |   | 4/1934  | Wolff    |          |
| 2,021,351 | A |   | 11/1935 | Carson   |          |
| 2,748,798 | A |   | 6/1956  | Withrow  |          |
| 2,837,110 | A |   | 6/1958  | Graybill |          |
| 3,036,594 | A |   | 5/1962  | Salisbury |         |
| 3,170,292 | A | * | 2/1965  | Howes et al. | ............... 60/39.08 |
| 3,209,536 | A | * | 10/1965 | Howes et al. | ................... 60/791 |

(Continued)

FOREIGN PATENT DOCUMENTS

| EP | 1447602  | 8/2004  |
|----|----------|---------|
| JP | 7280788  | 10/1995 |
| JP | 11013430 | 1/1999  |

OTHER PUBLICATIONS

European Search Report for European Application No. 11167039.4 mailed Nov. 19, 2014.

*Primary Examiner* — Phutthiwat Wongwian
*Assistant Examiner* — William Breazeal
(74) *Attorney, Agent, or Firm* — Carlson, Gaskey & Olds, P.C.

(57) ABSTRACT

An example method of accessing a valve assembly of a turbomachine includes accessing a check valve of the valve assembly from a first position that is radially outside a flow path through the turbomachine. The method accessing a shut off valve of the valve assembly from a second position that is radially outside the flow path. The check valve and the shut off valve are configured to influence communication of lubricant along a lubricant communication path that extends between a location radially outboard the flow path and a location radially inboard the flow path. The first position is the same as the second position in some examples.

8 Claims, 5 Drawing Sheets

(56) References Cited

U.S. PATENT DOCUMENTS

| | | | |
|---|---|---|---|
| 3,229,864 | A | 1/1966 | Roder |
| 3,424,319 | A | 1/1969 | Hohlfelder, Jr. et al. |
| 3,528,328 | A | 9/1970 | Jeanneret |
| 3,619,898 | A | 11/1971 | Perry et al. |
| 3,844,110 | A * | 10/1974 | Widlansky et al. .......... 60/39.08 |
| 3,975,817 | A | 8/1976 | Frazier |
| 3,994,540 | A | 11/1976 | Petersen |
| 4,414,997 | A | 11/1983 | Jacobson et al. |
| 4,607,764 | A | 8/1986 | Christine |
| 4,653,267 | A | 3/1987 | Brodell et al. |
| 4,655,248 | A * | 4/1987 | Chalaire ....................... 137/528 |
| 4,669,893 | A | 6/1987 | Chalaire et al. |
| 4,782,919 | A | 11/1988 | Chalaire et al. |
| 4,815,931 | A | 3/1989 | Linck et al. |
| 4,947,639 | A * | 8/1990 | Hibner et al. ................... 60/772 |
| 4,983,051 | A | 1/1991 | Hibner et al. |
| 5,002,023 | A | 3/1991 | Butterfield et al. |
| 5,107,804 | A | 4/1992 | Becker et al. |
| 5,172,659 | A | 12/1992 | Butterfield et al. |
| 5,207,192 | A | 5/1993 | Smith |
| 5,218,935 | A | 6/1993 | Quinn, Jr. et al. |
| 5,289,805 | A | 3/1994 | Quinn, Jr. et al. |
| 5,291,860 | A | 3/1994 | Quinn, Jr. |
| 5,361,735 | A | 11/1994 | Butterfield et al. |
| 5,386,807 | A | 2/1995 | Linder |
| 5,417,241 | A | 5/1995 | Tischer et al. |
| 5,497,738 | A | 3/1996 | Siemon et al. |
| 5,657,725 | A | 8/1997 | Butterfield et al. |
| 5,666,914 | A | 9/1997 | Ushida et al. |
| 5,816,731 | A | 10/1998 | Howard |
| 6,047,674 | A | 4/2000 | Kadowaki et al. |
| 6,142,672 | A | 11/2000 | Bently et al. |
| 6,247,434 | B1 | 6/2001 | Simpson et al. |
| 6,250,265 | B1 | 6/2001 | Simpson |
| 6,263,843 | B1 | 7/2001 | Todo et al. |
| 6,263,846 | B1 | 7/2001 | Simpson et al. |
| 6,311,655 | B1 | 11/2001 | Simpson et al. |
| 6,374,787 | B2 | 4/2002 | Simpson et al. |
| 6,763,791 | B2 | 7/2004 | Gardner et al. |
| 6,810,842 | B2 | 11/2004 | Itou |
| 7,000,580 | B1 | 2/2006 | Smith et al. |
| 7,278,516 | B2 * | 10/2007 | Zalewski et al. ................ 184/6.5 |
| 7,434,593 | B2 * | 10/2008 | Noll et al. ................... 137/15.18 |
| 7,574,854 | B2 * | 8/2009 | Moniz .......................... 60/39.08 |
| 2003/0070713 | A1 | 4/2003 | Cornea et al. |
| 2009/0078506 | A1 | 3/2009 | Franconi |

\* cited by examiner

ACCESSING A VALVE ASSEMBLY OF A TURBOMACHINE

BACKGROUND

This disclosure relates generally to a valve assembly. More particularly, this disclosure relates to accessing a check valve and a shut off valve of the valve assembly from a position that is radially outside a flow path of a turbomachine.

Turbomachines, such as gas turbine engines, are known. A typical turbomachine includes multiple sections, such as a fan section, a compression section, a combustor section, and a turbine section. During stable operation, the fan section moves air into the turbomachine. The air is compressed as the air flows through flow paths within the compression section. A compressed air is then mixed with fuel and combusted in the combustor section. Products of the combustion are expanded in the turbine section to rotatable drive the turbomachine.

Turbomachines include many components requiring lubricant. Valve assemblies are used in various areas of the turbomachine to control flow of lubricant between a lubricant supply and the components requiring lubricant. Positioning the valve assemblies near some components is often required. For example, within a gas turbine engine, a check valve is often more effective if the check valve is located near a damper assembly. Accessing the valve assemblies is difficult if the valve assemblies are located in some areas of the turbomachine. Repairing or replacing the valve assembly may necessitate accessing the valve assembly. Repairing or replacing other components of the turbomachine may necessitate accessing the valve assembly.

SUMMARY

An example valve assembly includes a check valve configured to be accessed from a first position that is radially outboard a flow path through a turbomachine. A shut off valve of the valve assembly is configured to be accessed from a second position that is radially outboard the flow path. The check valve and the shut off valve are operative to influence communication of lubricant along a lubricant communication path that extends between a first location radially outboard the flow path and a second location radially inboard the flow path. The first position is the same as the second position in some examples.

An example turbomachine assembly includes an intermediate case having an inner wall and an outer wall. A flow path is established between the inner wall and the outer wall. A check valve is configured to be accessed from a first position that is radially outboard the flow path. A shut off valve is configured to be accessed from a second position that is radially outboard the flow path. The check valve and the shut off valve are operative to influence communication of lubricant along a lubricant communication path extending between the inner wall and the outer wall.

An example method of accessing a valve assembly of a turbomachine includes accessing a check valve of the valve assembly from a first position that is radially outside a flow path through the turbomachine. The method accessing a shut off valve of the valve assembly from a second position that is radially outside the flow path. The check valve and the shut off valve are configured to influence communication of lubricant along a lubricant communication path that extends between a location radially outboard the flow path and a location radially inboard the flow path. The first position is the same as the second position in some examples.

These and other features of the disclosed examples can be best understood from the following specification and drawings, the following of which is a brief description:

DETAILED DESCRIPTION

Figure 1:
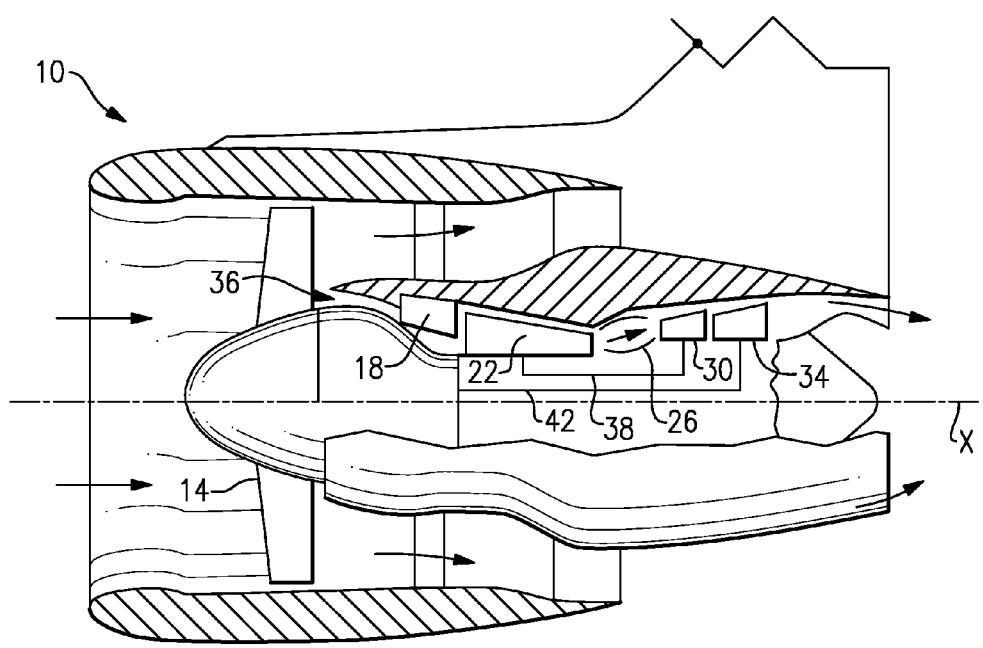
FIG. 1 shows a cross-section of an example gas turbine engine.

FIG. 1 schematically illustrates an example gas turbine engine 10, which is an example type of turbomachine. The example gas turbine engine 10 includes (in serial flow communication) a fan section 14, a low pressure compressor 18, a high pressure compressor 22, a combustor 26, a high pressure turbine 30, and a low pressure turbine 34. The gas turbine engine 10 is circumferentially disposed about an engine centerline X.

During operation, air is pulled into the gas turbine engine 10 by the fan section 14. Some of the air moves through a flow path 36 to a core of the gas turbine engine 10. The air moving through the flow path 36 is pressurized by the compressors 18 and 22, mixed with fuel, and burned within the combustor 26. The turbines 30 and 34 extract energy from the hot combustion gases flowing from the combustor 26.

In a two spool design, the high pressure turbine 30 utilizes the extracted energy from the hot combustion gases to power the high pressure compressor 22 through a high speed shaft 38, and the low pressure turbine 34 utilizes the extracted energy from the hot combustion gases to power the low pressure compressor and the fan section 14 through a low speed shaft 42.

The examples described in this disclosure are not limited to the two spool engine architecture described, however, and may be used in other architectures, such as single spool axial design, a three spool axial design, and still other architectures. Further, although the examples described herein are described with regard to the gas turbine engine 10, those having skill in this art and the benefit of this disclosure will understand that other examples include other types of turbomachines.

Figure 2:
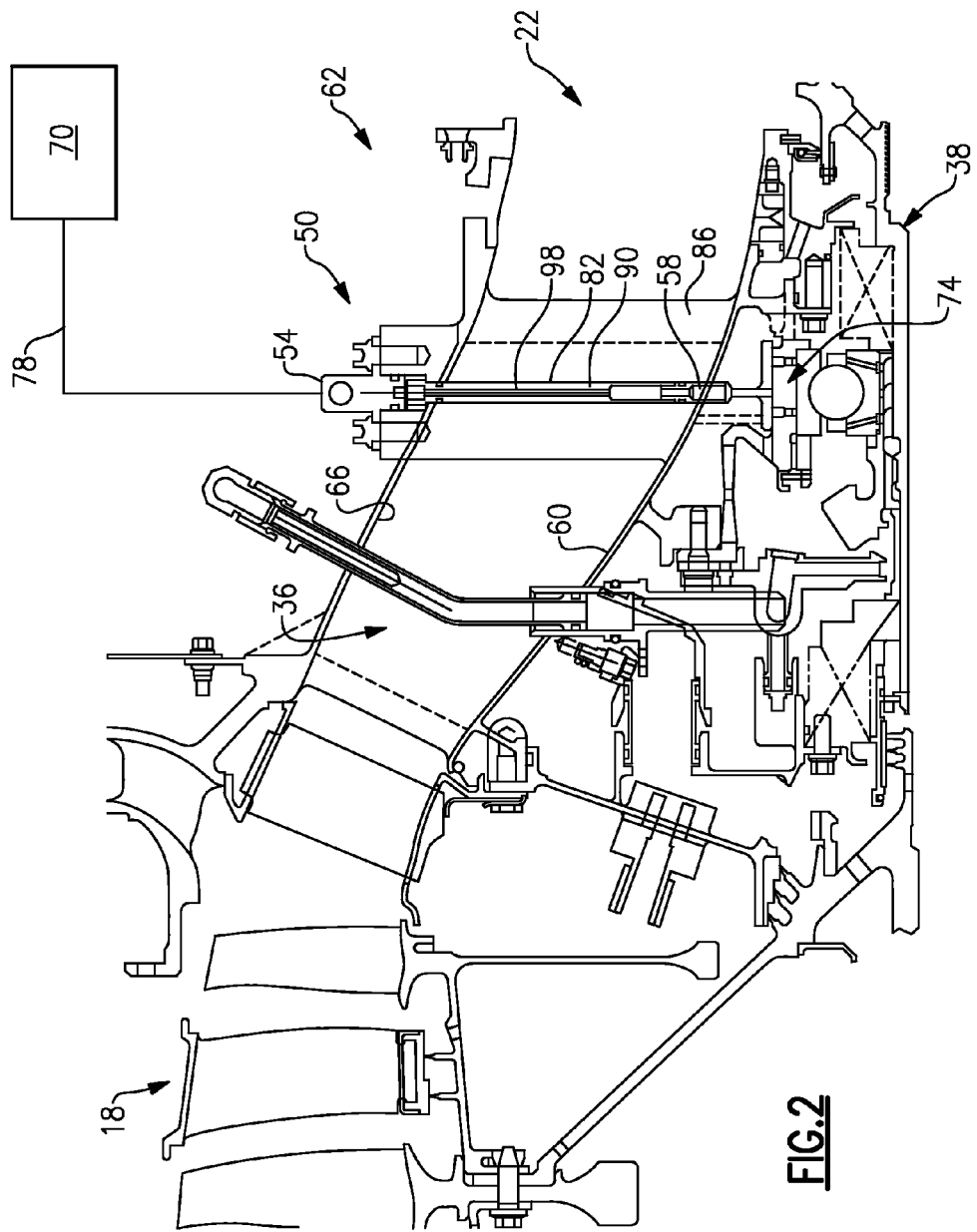
FIG. 2 shows a close-up view of the compression section of the FIG. 1 gas turbine engine.

Referring to FIG. 2 with continuing reference to FIG. 1, the flow path 36 is established between an inner wall 60 and an outer wall 66 of an intermediate case 62. Air communicates through a portion of the flow path 36 from the low pressure compressor 18 to the high pressure compressor section 22.

An example valve assembly 50 includes a shut off valve 54 and a check valve 58. The valve assembly 50 influences flow of lubricant from a lubricant supply 70 to a damper assembly 74 housed within the intermediate case 62. In this example, the damper assembly 74 is mounted to a thrust bearing of the high speed shaft 38. The damper assembly 74 is fed with lubricant, such as an oil, and facilitates reducing vibrations and deflections of the outer wall 66 and the overall structure of the engine 10.

The example valve assembly 50 controls flow of lubricant to the damper assembly 74. As can be appreciated, the shut off valve 54 of the valve assembly 50 is configured to block flow of lubricant to the damper assembly. The check valve 58 inhibits pressure pulses and lubricant flow from inside the damper assembly 74 from affecting other portions of the lubrication system within the engine 10.

In this example, lubricant communicates along a lubricant communication path 78 from the lubricant supply 70 to the damper assembly 74. A portion of the lubricant communication path 78 travels through a strut bore 82 established within a strut 86. The strut 86 extends between the inner wall 60 and the outer wall 66.

Figure 3:
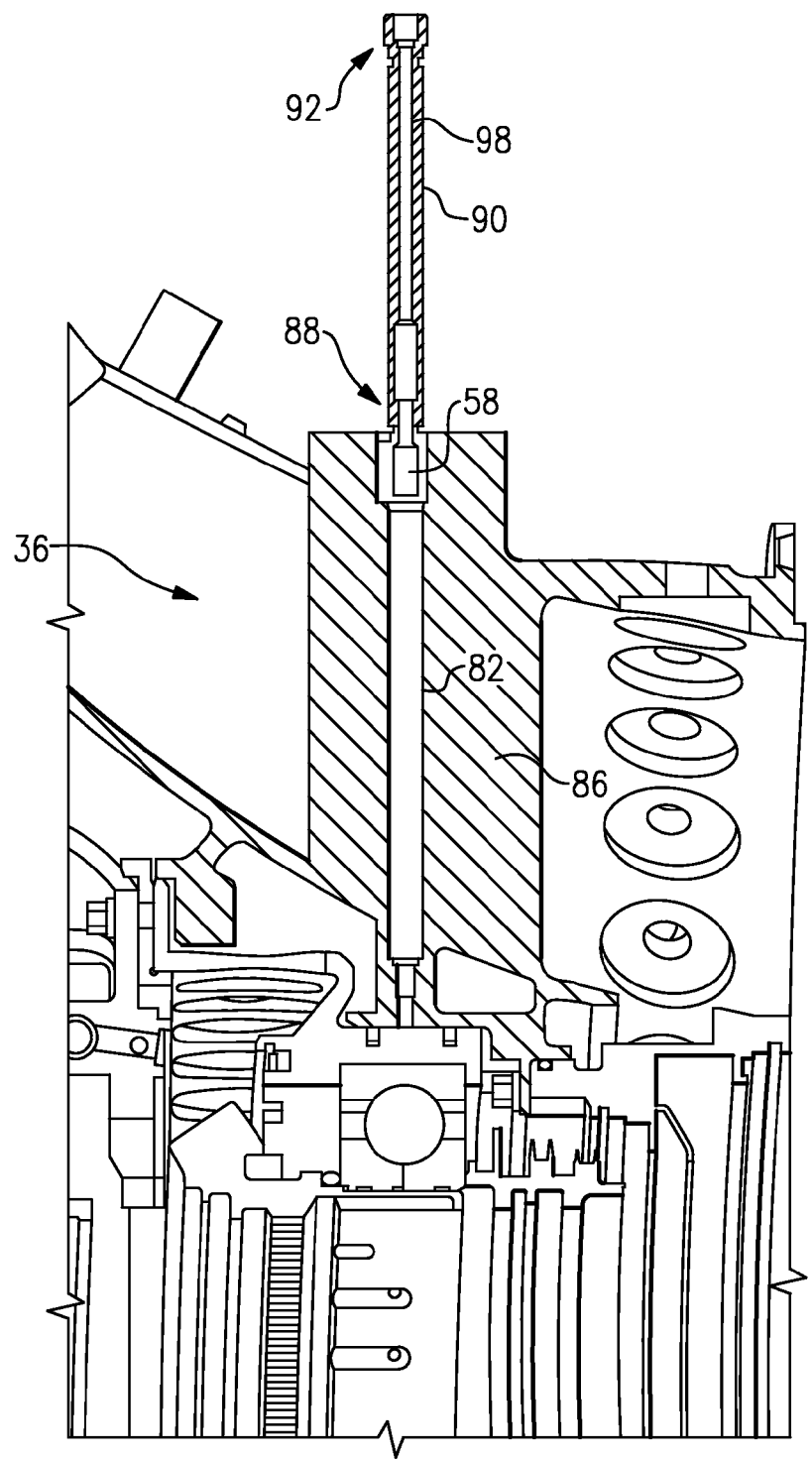
FIG. 3 shows a section view of a check valve of a valve assembly in an uninstalled position relative to the FIG. 1 gas turbine engine.
Figure 4:
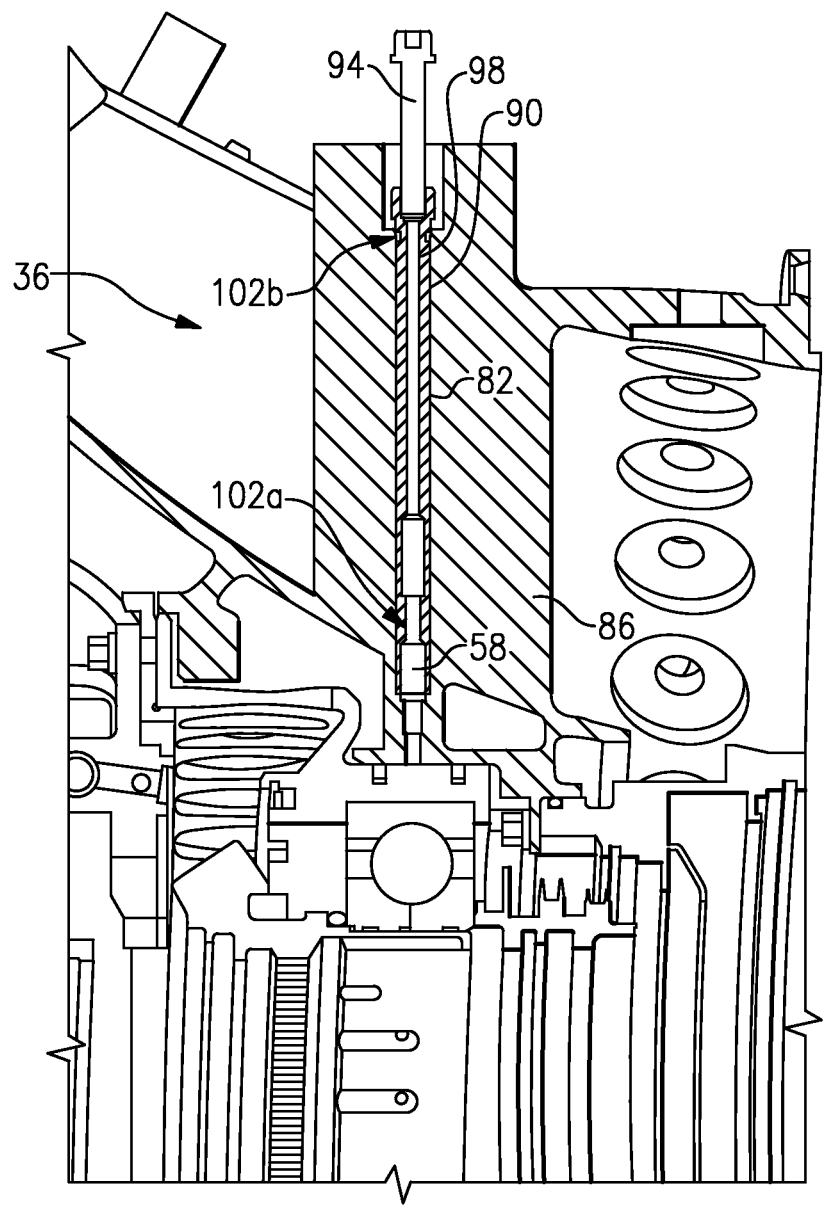
FIG. 4 shows the FIG. 3 check valve in an installed position relative to the FIG. 1 gas turbine engine.

Referring to FIGS. 3 and 4, the check valve 58 is disposed on one end 88 of a positioner rod 90. An opposing end 92 of the positioner rod 90 is threaded. During movement of the check valve 58 between the uninstalled position of FIG. 3 and the installed position of FIG. 4, a bolt 94 can be received within the threaded end of the positioner rod 90. As can be appreciated, the bolt 94 facilitates manipulating the position of the check valve 58 relative to the strut bore 82 by providing a grasping location for a user.

Securing the check valve 58 to the positioner rod 90 allows the check valve 58 to be moved radially. In this example, the check valve 58 is accessible from the first position that is radially outboard the flow path 36 even after the check valve 58 is installed within the engine 10. That is, the user can remove the check valve 58 from the engine 10 without requiring the user to interact with components of the engine 10 radially closer to the centerline X than the outer wall 66. Accessing the check valve 58 includes removing the check valve 58 from an installed position and repairing or replacing the check valve 58, for example.

The example positioner rod 90 establishes a longitudinally extending positioner bore 98. In this example, lubricant communicates from the lubricant supply 70 through the positioner bore 98 to the check valve 58 and to the damper assembly 74.

O-rings 102a and 102b seal interfaces between the check valve 58, the positioner rod 90 and the strut bore 82.

Figure 5:
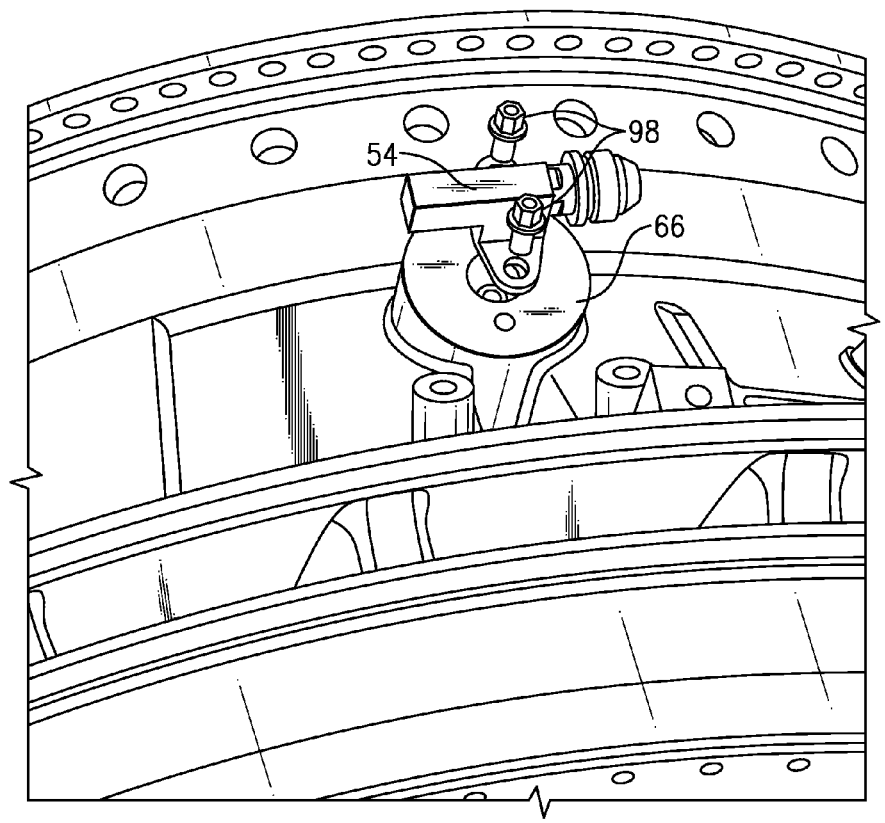
FIG. 5 shows a shut off valve of a valve assembly in an uninstalled position relative to the FIG. 1 gas turbine engine.

Referring to FIG. 5, the example damper shut off valve 54 of the valve assembly 50 is secured to the outer wall 66 after the check valve 58 is installed within the strut bore 82.

In this example, two bolts 98 threadably engage the outer wall 66 to hold the shut off valve 54 in an installed position. As can be appreciated, the shut off valve 54 limits radial movement of the positioner rod 90 and the check valve 58 when the shut off valve 54 is in an installed position.

The example shut off valve 54 houses a poppet valve that blocks lubricant flow from the lubricant supply 70 through the outer wall 66 when the lubricant within the damper assembly 74 exhibits certain pressures. Valves other than poppet valves are used in other examples.

The example shut off valve 54 is accessible from a position radially outside the outer wall 66. That is, removing the bolts 98 enables the user to remove the shut off valve 54 without requiring the user to interact with components of the engine 10 radially closer to the centerline X than the outer wall 66. Accessing the shut off valve 54 is required when servicing the shut off valve 54, for example.

Features of the disclose examples include a check valve and a shut off valve that influence flow to a flow of lubricant to a bearing damper within an intermediate case of a turbomachine. The shut off valve and the check valve are accessible from a position that is radially outside a flow path of the engine. The features of the shut off valve and the check valve enable servicing the check valve and the shut off valve without requiring substantial tear down of the turbomachine. The shut off valve and check valve are line replaceable, for example.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A gas turbine comprising:
   an intermediate case comprising a flow path between a radially inner wall and a radially outer wall;
   a strut having a radial bore;
   said strut extending from said radially outer wall to said radially inner wall and positioned between a low pressure compressor and a high pressure compressor;
   a contiguous lubricant-communication path partially extending through said radial bore and comprising: a positioning rod, a check valve, and a shut off valve;
   said positioning rod having a longitudinal positioning-rod bore, a first terminus, and a second terminus;
   a valve-positioning assembly comprising:
   said check valve mounted to said first terminus,
   said shut-off valve mounted to said second terminus,
   wherein said check valve and said positioning rod are inserted in said radial bore.

2. The gas turbine of claim 1, wherein the shut off valve comprises a poppet valve.

3. The gas turbine of claim 1, wherein the check valve is configured to block a flow of lubricant through said lubricant-communication path.

4. The valve gas turbine of claim 1, wherein said second terminus is configured to engage a threaded fastener.

5. The gas turbine of claim 1, wherein the lubricant-communication path communicates lubricant to a bearing damper within the intermediate case.

6. The gas turbine of claim 5, wherein the check valve and the shut-off valve are axially aligned with the bearing damper of the turbomachine.

7. A method of servicing a valve-positioning assembly of a gas turbine engine comprising an intermediate case comprising a flow path between a radially inner wall and a radially outer wall, the method comprising:
   providing a strut having a radial bore;
   extending said strut from said radially outer wall to said radially inner wall and positioning said strut between a low pressure compressor and a high pressure compressor;
   providing a contiguous lubricant-communication path partially extending through said radial bore that comprises: a positioning rod, a check valve, and a shut off valve;
   wherein said positioning rod has a longitudinal positioning-rod bore, a first terminus, and a second terminus;
   providing a valve-positioning assembly comprising:
   said check valve mounted to said first terminus,
   said shut-off valve mounted to said second terminus,
   wherein said check valve and said positioning rod are inserted in said radial bore; and
   removing said valve-positioning assembly from said radial bore; and
   repairing or replacing said valve-positioning assembly, or repairing and replacing said valve-positioning assembly.

8. The method of claim 7, wherein the removing comprises using at least one bolt to remove the check valve.

* * * * *